United States Patent
Hosabettu et al.

(10) Patent No.: US 10,691,937 B2
(45) Date of Patent: Jun. 23, 2020

(54) METHOD AND SYSTEM FOR DETERMINING STRUCTURAL BLOCKS OF A DOCUMENT

(71) Applicant: Wipro Limited, Bangalore (IN)

(72) Inventors: Raghavendra Hosabettu, Bengaluru (IN); Sneha Subhaschandra Banakar, Bengaluru (IN)

(73) Assignee: Wipro Limited, Bangalore (IN)

( * ) Notice: Subject to any disclaimer, the term of this patent is extended or adjusted under 35 U.S.C. 154(b) by 93 days.

(21) Appl. No.: 16/134,657

(22) Filed: Sep. 18, 2018

(65) Prior Publication Data

US 2020/0034611 A1 Jan. 30, 2020

(30) Foreign Application Priority Data

Jul. 30, 2018 (IN) .............................. 201841028613

(51) Int. Cl.
*G06K 9/34* (2006.01)
*G06K 9/00* (2006.01)
*G06K 9/72* (2006.01)

(52) U.S. Cl.
CPC ..... *G06K 9/00463* (2013.01); *G06K 9/00456* (2013.01); *G06K 9/72* (2013.01); *G06K 2209/01* (2013.01)

(58) Field of Classification Search
CPC .. G06K 9/00463; G06K 9/72; G06K 9/00456; G06K 2209/01
See application file for complete search history.

(56) References Cited

U.S. PATENT DOCUMENTS

| 5,784,487 A | 7/1998 | Cooperman |
| 5,848,184 A | 12/1998 | Taylor |
| 2010/0150448 A1* | 6/2010 | Lecerf ................. G06K 9/2072 382/190 |
| 2019/0019052 A1* | 1/2019 | Pao ....................... G06K 9/3258 |

OTHER PUBLICATIONS

El-Haj et al., "Detecting Document Structure in a Very Large Corpus of UK Financial Reports", 4 pages, Retrieved from the Internet:<http://ucrel.lancs.ac.uk/cfie/El-HajEtAl_Irec14.pdf>, Sep. 17, 2018.

(Continued)

*Primary Examiner* — Dhaval V Patel
(74) *Attorney, Agent, or Firm* — Finnegan, Henderson, Farabow, Garrett & Dunner, LLP

(57) ABSTRACT

This disclosure relates to method and system for determining structural blocks of a document. The method may include extracting text lines from the document, generating a feature vector for each text line by determining feature values for a set of features in the each text line, and determining at least one dominant feature from among the set of features and at least one corresponding dominance factor, for each structural class, based on the feature vector for each text line. The method may further include deriving a set of rules for classification of the text lines into respective structural classes and determining a structural block tag for each text line based on the set of rules. Each of the set of rules correspond to one of the structural classes and is based on the at least one dominant feature and the at least one corresponding dominance factor for that class.

20 Claims, 8 Drawing Sheets

(56) References Cited

OTHER PUBLICATIONS

Liang et al., "Document Layout Structure Extraction Using Bounding Boxes of Different Entities", 1996, pp. 278-283, IEEE, Retrieved from the Internet:<http://haralick.org/conferences/76200278.pdf>.
Rauf et al., "Logical Structure Extraction from Software Requirements Documents", 10 pages, Retrieved from the Internet:<https://gsd.uwaterloo.ca/sites/default/files/Framework_0.pdf>, Sep. 17, 2018.

* cited by examiner different style and contains mostly simple tables. We use the Wall Street Journal data set as a test set to validate our models and the improvements to them. Table 1 shows statistics of the training set and the test set we built on WSJ data set.

*2.3.2 Table Extraction Evaluation*

To evaluate the line labeling component of extraction, we use four measures: line accuracy, recall, precision and the F-measure. These four measures focus on different parts of line labeling performance. Line accuracy is the percentage of correct line labels over all lines. It shows the overall accuracy and general performance. Recall is the percentage of correct table lines the program labels over all table lines in the documents. Precision is the percentage of the correct table lines the program labels over all table labels. The F-measure is (2×Recall×Precision)/(Recall+Precision). Recall, precision and the F-measure show the system performance on a predefined set of labels for table components. A heuristic technique for labeling, which was developed by Pinto et al (Pinto et al. 2002), uses a smaller set of labels than the CRF-based technique we developed. In order to make the CRF results comparable with the heuristic results, multiple related CRF labels are combined to make one heuristic label.

FIG. 5A

| Line No. | Tag | X | Y | End X | Font Size | No of words in Line | Bold | Italic | Previous line spacing | Next line spacing | Line width |
|---|---|---|---|---|---|---|---|---|---|---|---|
| 1 | 1 | 90.0803 | 80.96002 | 522.0797 | 10 | 20 | 0 | 0 | 0 | 17.28003 | 431.999413 |
| 2 | 1 | 90.0808 | 98.24005 | 522.0801 | 10 | 19 | 0 | 0 | 17.28003 | 17.28003 | 431.999939 |
| 3 | 1 | 90.0812 | 115.5201 | 205.521 | 10 | 7 | 0 | 0 | 17.28003 | 20.15992 | 115.439985 |
| 4 | 2 | 90.0803 | 135.68 | 244.8799 | 11 | 4 | 0 | 1 | 20.15992 | 18 | 154.799568 |
| 5 | 1 | 90.0803 | 153.68 | 522.0797 | 10 | 15 | 0 | 0 | 18 | 17.28002 | 431.999352 |
| 6 | 1 | 90.0807 | 170.96 | 522.0798 | 10 | 15 | 0 | 0 | 17.28002 | 17.03998 | 431.999085 |
| 7 | 1 | 90.0808 | 188 | 522.08 | 10 | 18 | 0 | 0 | 17.03998 | 17.28003 | 431.999207 |
| 8 | 1 | 90.0811 | 205.28 | 522.0804 | 10 | 18 | 0 | 0 | 17.28003 | 17.28003 | 431.999085 |
| 9 | 1 | 90.0812 | 222.5601 | 522.0804 | 10 | 18 | 0 | 0 | 17.28003 | 17.28003 | 431.999207 |
| 10 | 1 | 90.0814 | 239.8401 | 522.0808 | 10 | 13 | 0 | 0 | 17.28003 | 17.28003 | 431.999939 |

> There are many examples of the use of DAR techniques into both commercial and research-driven systems. Some systems have been in use (with continuous improvements) for decades and are now widely identified as successful DAR applications. We can split the DAR applications into two broad categories: business-oriented and user-centered ones.
>
> Office documents reach a total of more than 85% of the amount of new original information stored on paper in the world [1]. It is therefore not surprising that business-oriented applications received a great interest. In this category we can include the automatic check processing (including both amount reading and signature verification), the information extraction from forms and invoices, the automatic document organization that involves page classification.

$r1 = f1 \cdot d1(\pm t1) + f2 \cdot d2(\pm t2) + f3 \cdot d3(\pm t3) + \ldots + fn \cdot dn(\pm tn)$ where r1 is rule 1 corresponding to a particular structural class, f1, f2, f3...fn are the feature values for dominant features, d1, d2, d3...dn are the respective dominance factors for the dominant features, and t1, t2, t3...tn are the respective threshold values for the dominant features.

FIG. 5D

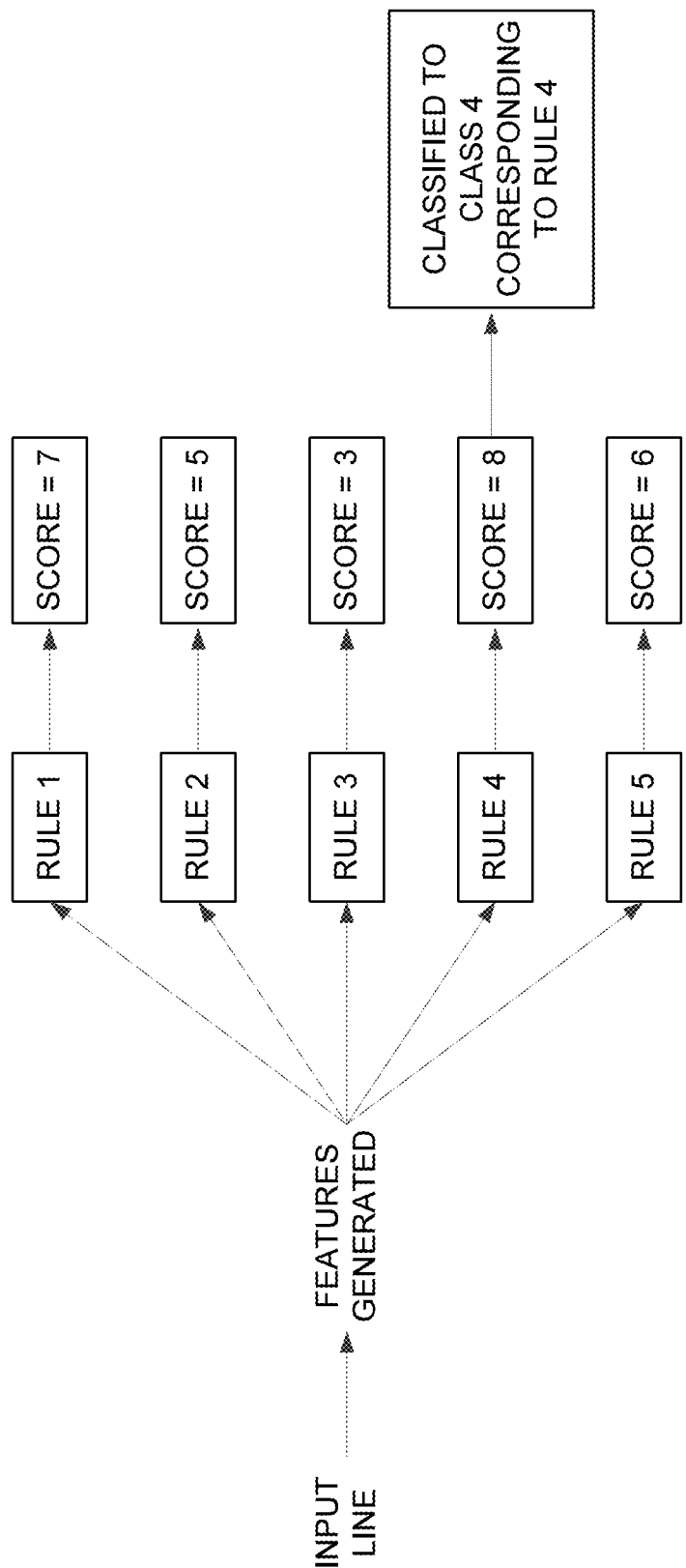

METHOD AND SYSTEM FOR DETERMINING STRUCTURAL BLOCKS OF A DOCUMENT

This application claims the benefit of Indian Patent Application Serial No. 201841028613, filed Jul. 30, 2018, which is hereby incorporated by reference in its entirety.

FIELD

This disclosure relates generally to document processing, and more particularly to method and system for determining structural blocks of a document.

BACKGROUND

A wide variety of applications may require processing of documents to perform contextual data interpretation. As will be appreciated, document processing may typically involve conversion of a paper or electronic document into electronic information (that is, data) that may be worked upon. Further, as will be appreciated, for any document processing technique, an important task may be extraction of a structure of the document. A knowledge of logical structure of the document may help in accurate extraction of data. A logical layout structure may include the classification of the structural blocks of the document into headers, footers, title, paragraphs, section headers, footnotes, references, table of content, and the like.

However, the documents generally do not follow a standardized structure, thereby making extraction of data from the documents a challenging task. For example, portable document format (PDF) is one of the most common formats for documents today. Though the PDF format is optimized for presentation, it typically lacks structural information. Further, there may be different application programming interfaces (APIs) and encoding techniques used to build a PDF document. Thus, when a program wants to extract structural information, there are no standard tags or properties based on which various sections or structural blocks of document may be identified. In any large-scale application, the document processing techniques may have to cope with a large number of variations in layout of the documents and the problem may be further amplified.

Existing techniques for identification of structural blocks within the documents scope are limited in their scope, utility, and application. For example, one of the existing techniques provide for structure extraction from a corpus of financial reports. The technique extracts headers in the document, and then, using the extracted headers as bookmarks, extracts narrative section under each heading. This technique may prove useful in extraction of structure of a document pertaining to financial domain but may not be applicable to a document pertaining to other domains. Another existing technique provides for extraction and classification of a document page layout structure by analyzing the spatial configuration of the bounding boxes of different entities on a given document image. The technique segments the document image into a list of homogeneous regions and classify them into texts, images, tables, line-drawings, halftones, ruling lines, or noise. Though this technique is useful to segment blocks of document as images, texts, or tables, the actual structure of the text content may not be determined. In particular, the text content may not be differentiated into paragraphs, title, footnotes, and the like. Further, this technique is limited in its application to image documents which are present in a structured manner as it makes use of spatial configuration. One of the other existing techniques provide for a template based approach for extracting logical structures of a document. In particular, the techniques provide for a framework for the specification of logical structures as templates and the extraction of their instances from rich text documents. However, the template based approach may work well only when the layout (i.e., logical structure) of the document is consistent, but may fail for a set of documents with large variations. Further, a new template will have to be specified or introduced for any new document structure.

SUMMARY

In one embodiment, a method for determining structural blocks of a document is disclosed. In one example, the method may include extracting a plurality of text lines from the document. The method may further include generating a feature vector for each of the plurality of text lines by determining a set of feature values for a set of corresponding features in each of the plurality of text lines. The method may further include determining at least one dominant feature from among the set of corresponding features and at least one corresponding dominance factor, for each of a plurality of structural classes, based on the feature vector for each of the plurality of text lines. The method may further include deriving a set of rules for classification of the plurality of text lines into the plurality of structural classes. Each of the set of rules correspond to one of the plurality of structural classes and is based on the at least one dominant feature and the at least one corresponding dominance factor for that class. The method may further include determining a structural block tag for each of the plurality of text lines based on the set of rules.

In one embodiment, a system for determining structural blocks of a document is disclosed. In one example, the system may include a document analysis device, which may include at least one processor and a memory communicatively coupled to the at least one processor. The memory may store processor-executable instructions, which, on execution, may cause the processor to extract a plurality of text lines from the document. The processor-executable instructions, on execution, may further cause the processor to generate a feature vector for each of the plurality of text lines by determining a set of feature values for a set of corresponding features in each of the plurality of text lines. The processor-executable instructions, on execution, may further cause the processor to determine at least one dominant feature from among the set of corresponding features and at least one corresponding dominance factor, for each of a plurality of structural classes, based on the feature vector for each of the plurality of text lines. The processor-executable instructions, on execution, may further cause the processor to derive a set of rules for classification of the plurality of text lines into the plurality of structural classes. Each of the set of rules correspond to one of the plurality of structural classes and is based on the at least one dominant feature and the at least one corresponding dominance factor for that class. The processor-executable instructions, on execution, may further cause the processor to determine a structural block tag for each of the plurality of text lines based on the set of rules.

In one embodiment, a non-transitory computer-readable medium storing computer-executable instructions for determining structural blocks of a document is disclosed. In one example, the stored instructions, when executed by a processor, may cause the processor to perform operations including extracting a plurality of text lines from the document. The operations may further include generating a feature vector for each of the plurality of text lines by determining a set of feature values for a set of corresponding features in each of the plurality of text lines. The operations may further include determining at least one dominant feature from among the set of corresponding features and at least one corresponding dominance factor, for each of a plurality of structural classes, based on the feature vector for each of the plurality of text lines. The operations may further include deriving a set of rules for classification of the plurality of text lines into the plurality of structural classes. Each of the set of rules correspond to one of the plurality of structural classes and is based on the at least one dominant feature and the at least one corresponding dominance factor for that class. The operations may further include determining a structural block tag for each of the plurality of text lines based on the set of rules.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 5A-5D illustrates an exemplary implementation of techniques for deriving a set of rules for classification of text lines into their respective structural classes, in accordance with some embodiments of the present disclosure;

FIG. 6 is an exemplary implementation of the set of rules for determining structural class of a text line, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
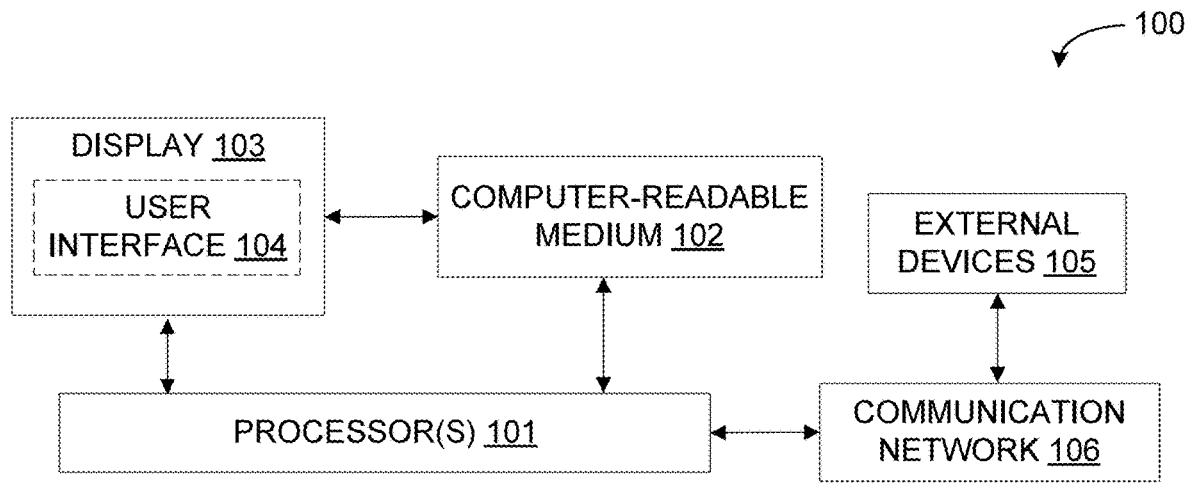
FIG. 1 is a block diagram of an exemplary system for determining structural blocks of a document, in accordance with some embodiments of the present disclosure.

Referring now to FIG. 1, an exemplary system 100 for determining structural blocks of a document is illustrated, in accordance with some embodiments of the present disclosure. In particular, the system 100 may include a document analysis device (for example, server, desktop, laptop, notebook, netbook, tablet, smartphone, mobile phone, or any other computing device) that implements a structural blocks detection and annotation engine so as to determine structural blocks of the document. It should be noted that, in some embodiments, the structural blocks detection and annotation engine may extract the determined structural blocks or annotate the document with the determined structural blocks. As will be described in greater detail in conjunction with FIGS. 2-6, the structural blocks detection and annotation engine may extract a plurality of text lines from the document. The structural blocks detection and annotation engine may then generate a feature vector for each of the plurality of text lines by determining a set of feature values for a set of corresponding features in each of the plurality of text lines. The structural blocks detection and annotation engine may then determine at least one dominant feature from among the set of corresponding features and at least one corresponding dominance factor, for each of a plurality of structural classes, based on the feature vector for each of the plurality of text lines. The structural blocks detection and annotation engine may then derive a set of rules for classification of the plurality of text lines into the plurality of structural classes. Each of the set of rules correspond to one of the plurality of structural classes and is based on the at least one dominant feature and the at least one corresponding dominance factor for that class. The structural blocks detection and annotation engine may further employ the set of rules to determine a structural block tag for each of a plurality of text lines in a document.

The system 100 may include one or more processors 101, a computer-readable medium (for example, a memory) 102, and a display 103. The computer-readable storage medium 102 may store instructions that, when executed by the one or more processors 101, cause the one or more processors 101 to determine structural blocks of a document, in accordance with aspects of the present disclosure. The computer-readable storage medium 102 may also store various data (for example, documents, extracted text, text lines, features, feature values, feature vector, dominant features, dominance factors, threshold values, set of rules, structural block tags, and the like) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but may not be limited to, a remote server, a digital device, or another computing system.

Figure 2:
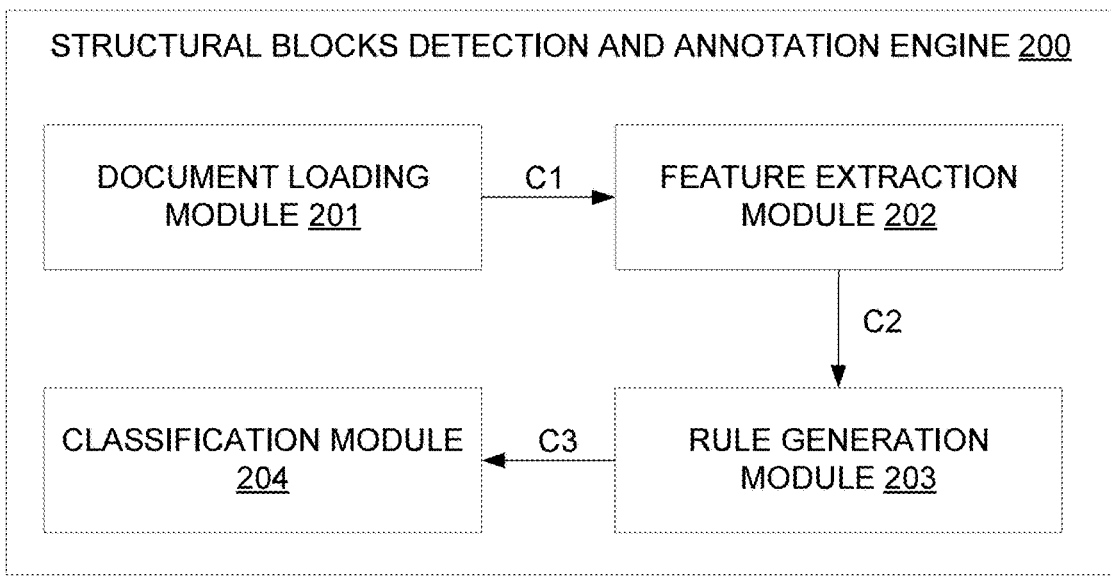
FIG. 2 is a functional block diagram of a structural blocks detection and annotation engine, in accordance with some embodiments of the present disclosure.

Referring now to FIG. 2, a functional block diagram of a structural blocks detection and annotation engine 200, implemented by the system 100 of FIG. 1, is illustrated, in accordance with some embodiments of the present disclosure. The structural blocks detection and annotation engine 200 may include various modules that perform various functions so as to determine structural blocks of a document and to extract or annotate the determined structural blocks. In some embodiments, the structural blocks detection and annotation engine 200 may include a document loading module 201, a feature extraction module 202, a rule generation module 203, and a classification module 204. As will be appreciated by those skilled in the art, all such aforementioned modules 201-204 may be represented as a single module or a combination of different modules. Moreover, as will be appreciated by those skilled in the art, each of the modules 201-204 may reside, in whole or in parts, on one device or multiple devices in communication with each other.

The document loading module 201 may receive a document that needs to be processed by the structural blocks detection and annotation engine 200 from one or more sources. For example, in some embodiments, the document loading module 201 may receive the document directly from an input device (for example, scanner, camera, and the like) or an external device (for example, smartphone, and the like). Additionally, in some embodiments, the document loading module 201 may receive the document uploaded by a user via the user interface. The document may be in any unstructured format (that is, the structural blocks may not be defined in the document). For example, the document may be an unstructured image document or an unstructured text document. The unstructured image document may include, but may not be limited to, a portable document format (.pdf), a joint photographic experts group format (.jpg or .jpeg), a tagged image file format (.tiff or .tif), a bitmap image file format (.bmp), a graphics interchange format (.gif), and a PNG format (.png). Further, in case of image documents, the document loading module 201 may perform an optical text recognition on the received image document to generate the unstructured text document. As will be appreciated, the unstructured text document may be required for subsequent processing by other modules 202-204 so as to detect and analyze structural information in its data content.

The feature extraction module 202 may receive the unstructured text document from the document loading module 201 via a C1 interface using standard wired or wireless data transfer protocols. The feature extraction module 202 may then extract text lines from the unstructured text document. In some embodiments, the text lines may be extracted by applying a text extraction tool with a pre-defined or a dynamic threshold on the document. The feature extraction module 202 may then generate a set of feature values corresponding to a set of features in each of the text lines in the unstructured text document. The features may include, but may not be limited to, a positional feature, a font feature, a count feature, and a spacing feature. The feature values may include, but may not be limited to, positional coordinates of the text line, a font size in the text line, a font weight in the text line, one or more flags for one or more font styles, a length of the text line, and a spacing between each of the two text lines. As will be appreciated, the feature values may be based on details of the features (for example, spacing, font details, width, height, and the like) and may be derived using any standard document reader library. Thus, all the features in a text line may have numeric feature values. The feature values for a given text line may then be used to generate a feature vector for the text line.

The rule generation module 203 may receive unstructured text document along with the feature vectors for each of the text lines in the unstructured text document from the features extraction module 202 via a C2 interface using standard wired or wireless data transfer protocols. The rule generation module 203 may then tag each of the text lines to various structural block classes based on the document property information extracted by the feature extraction module 202. The structural block classes may include, but may not be limited to, a paragraph, a paragraph start, a paragraph end, a single line, a title, a section header, a footnote, a list, and a table of content.

Further, the rule generation module 203 may determine one or more dominant features from among the set of corresponding features, for each of the structural block classes, based on the feature vector for each of the plurality of text lines. The dominant features may be determined by comparing the feature vector for a text line with a set of feature vectors of a set of neighboring text lines. In some embodiments, the set of neighboring text lines may include a pre-defined set of preceding text lines, a pre-defined set of successive text lines, or both. For example, the set of neighboring text lines may include 4 text lines (that is, window size as 4). In such case, the feature vectors for preceding 2 text lines and the succeeding 2 text lines may be compared with the feature vector of a given text line. The rule generation module 203 may also determine dominance factor corresponding to each of the dominant features for a given class.

The rule generation module 203 may then derive a set of rules for classification of the plurality of text lines into the plurality of structural classes. It should be noted that each of the set of rules may correspond to one of the structural classes and may be based on the one or more dominant features and the one or more corresponding dominance factor for that class. For example, each of the set of rules may correspond to a sum of the one or more dominant features modified by the one or more corresponding dominance factors.

Additionally, in some embodiments, the rule generation module 203 may determine thresholds (constraints) corresponding to each of the dominant features for a given class. The rule generation module 203 may, first, initialize a threshold value for a dominant feature based on an initial difference between feature values for the dominant feature. The rule generation module 203 may, then, dynamically adjust the threshold value in each of a number of subsequent passes. As will be appreciated, in such embodiments, each of the set of rules may be further based on the one or more threshold values for corresponding dominant features for that class. For example, each of the set of rules may correspond to a sum of the one or more dominant features modified by the one or more corresponding dominance factors and the one or more corresponding threshold values.

The classification module 204 may receive the set of rules from the rule generation module 203 via a C3 interface using standard wired or wireless data transfer protocols. The classification module 204 may then employ the set of rules to determine and extract structural block tag for each of the text lines in any given document. The classification module 204 may, first, determine a set of scores for a text line based on the set of rules. The classification module 204 may, then, determine the structural block tag corresponding to one of the structural classes based on an indicative score among the set of scores. Thus, once the set of rules is derived, the same may be employed by the classification module 204 to automatically detect and extract structural blocks of an input document so as to identify contextual text for the input document.

By way of example, the structural blocks detection and annotation engine 200 may load a sample document. The structural blocks detection and annotation engine 200 may process the sample input document so as to detect and extract all the structural elements (e.g., paragraph, footnote, section header, title, and the like) present in the sample input document. In other words, the structural blocks detection and annotation engine 200 may detect and extract structural block tags for the text lines in the sample input document. The structural blocks detection and annotation engine 200 may further process the sample input document so as to detect and extract various features (e.g., positional co-ordinates in the page, font details, and the like) and their corresponding values in each of the text lines of the sample input document. The structural blocks detection and annotation engine 200 may then generate feature vectors corresponding to the text lines based on the extracted information. The structural blocks detection and annotation engine 200 may further determine one or more dominant features along with corresponding dominance factor and threshold values for each structural class by analyzing the feature vectors and the structural block tags. The structural blocks detection and annotation engine 200 may further derive a set of rules, for classification of the text lines into their respective structural classes, based on the dominant features, corresponding dominance factor, and corresponding threshold values for each of the structural classes.

Further, by way of example, the structural blocks detection and annotation engine 200 may load an input document. The structural blocks detection and annotation engine 200 may then process and analyze the input document to extract information about each text line of the document. The extracted information may be text features (i.e., structural information and text characteristics) of the text line, such as positional co-ordinates in the page, font details, and the like. The structural blocks detection and annotation engine 200 may further use the extracted information as inputs for the set of rules so as to compute scores, to classify each text line into one of the structural classes based on the computed scores, and to detect boundaries for each structural block.

It should be noted that the structural blocks detection and annotation engine 200 may be implemented in programmable hardware devices such as programmable gate arrays, programmable array logic, programmable logic devices, and so forth. Alternatively, the structural blocks detection and annotation engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for determining structural blocks of a document. For example, the exemplary system 100 and the associated structural blocks detection and annotation engine 200 may determine structural blocks of a document by the processes discussed herein. In particular, as will be appreciated by those of ordinary skill in the art, control logic and/or automated routines for performing the techniques and steps described herein may be implemented by the system 100 and the structural blocks detection and annotation engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
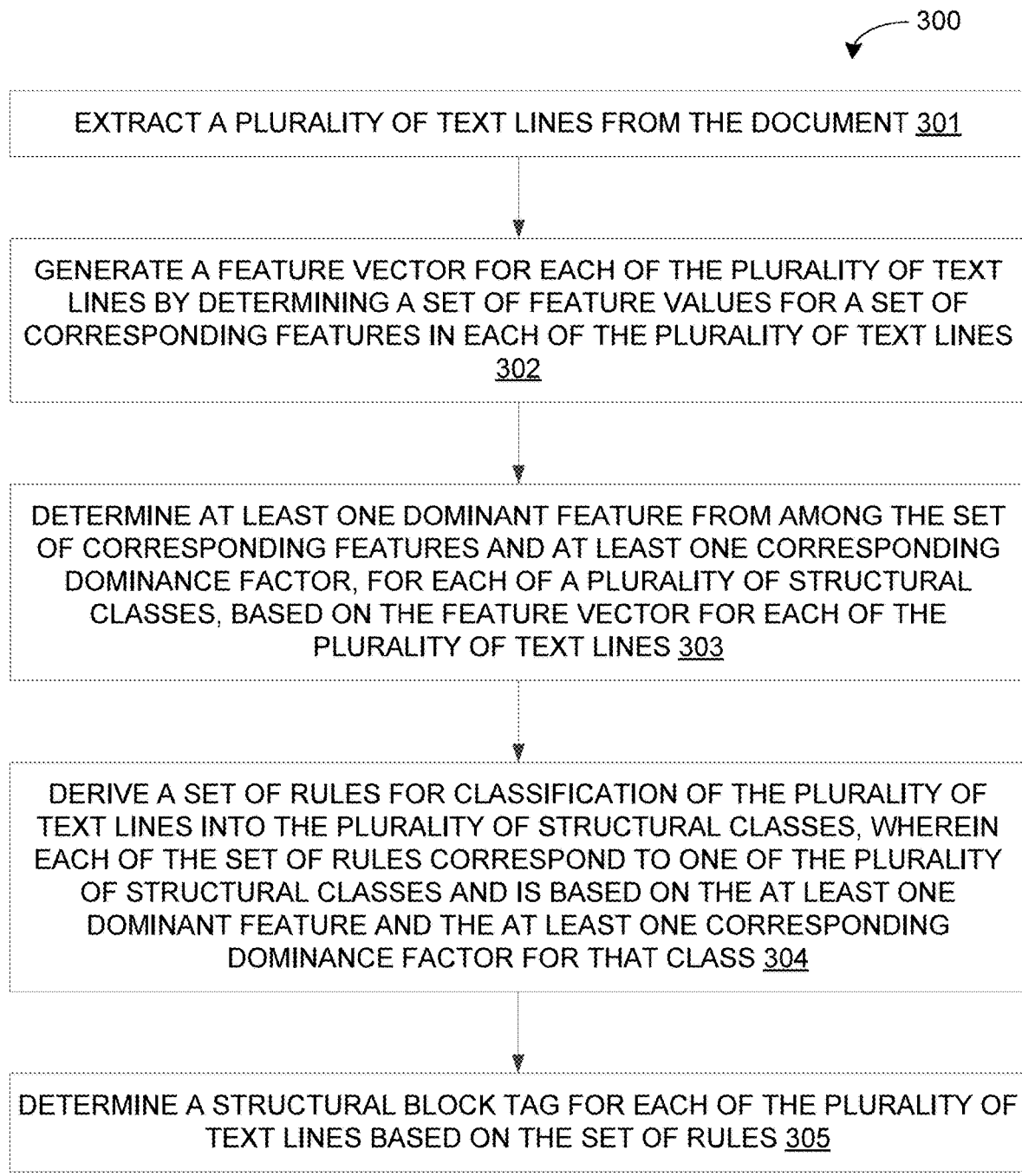
FIG. 3 is a flow diagram of an exemplary process for determining structural blocks of a document, in accordance with some embodiments of the present disclosure.

For example, referring now to FIG. 3, exemplary control logic 300 for determining structural blocks of a document via a system, such as the system 100, is depicted via a flowchart, in accordance with some embodiments of the present disclosure. As illustrated in the flowchart, the control logic 300 may include the steps of extracting a plurality of text lines from the document at step 301, and generating a feature vector for each of the plurality of text lines by determining a set of feature values for a set of corresponding features in each of the plurality of text lines at step 302. The control logic 300 may further include the step of determining at least one dominant feature from among the set of corresponding features and at least one corresponding dominance factor, for each of a plurality of structural classes, based on the feature vector for each of the plurality of text lines at step 303. The control logic 300 may further include the step of deriving a set of rules for classification of the plurality of text lines into the plurality of structural classes. It should be noted that each of the set of rules may correspond to one of the plurality of structural classes and may be based on the at least one dominant feature and the at least one corresponding dominance factor for that class. The control logic 300 may further include the step of determining a structural block tag for each of the plurality of text lines based on the set of rules. In some embodiments, the control logic 300 may further include the steps of receiving an image document, and performing optical text recognition on the image document to generate the document.

In some embodiments, extracting the plurality of text lines at step 301 may include the step of applying a text extraction tool with a pre-defined or a dynamic threshold on the document. Additionally, in some embodiments, the set of corresponding features may include at least one of a positional feature, a font feature, a count feature, or a spacing feature. Further, in some embodiments, the set of feature values for the set of corresponding features may include at least one of positional coordinates of a text line, a font size in the text line, one or more flags for one or more font styles, a length of the text line, or a spacing between at least two of the plurality of text line.

In some embodiments, the determining the at least one dominant feature at step 303 may include comparing the feature vector for a text line with a set of feature vectors of a set of neighboring text lines. In such embodiments, the set of neighboring text lines may include at least one of a pre-defined set of preceding text lines, or a pre-defined set of successive text lines. Additionally, in some embodiments, each of the set of rules at step 304 may include a sum of the at least one dominant feature modified by the at least one corresponding dominance factor.

In some embodiments, the control logic 300 may further include the step of determining at least one corresponding threshold value for the at least one dominant feature. In such embodiments, determining the at least one corresponding threshold value for the at least one dominant feature may include the steps of initializing the at least one corresponding threshold value based on an initial difference between feature values for the at least one dominant feature, and dynamically adjusting the at least one corresponding threshold value in each of a plurality of subsequent passes. Additionally, in such embodiments, each of the set of rules at step 304 may include a sum of the at least one dominant feature modified by the at least one corresponding dominance factor and the at least one corresponding threshold value.

In some embodiments, determining the structural block tag at step 305 may include the steps of determining a set of scores for a text line based on the set of rules, and determining the structural block tag corresponding to one of the plurality of structural classes based on an indicative score among the set of scores. Additionally, in some embodiments, the structural block tag may include one of a paragraph tag, a paragraph start tag, a paragraph end tag, a single line tag, a title tag, a section header tag, a footnote tag, a list tag, or a table of content tag.

Figure 4:
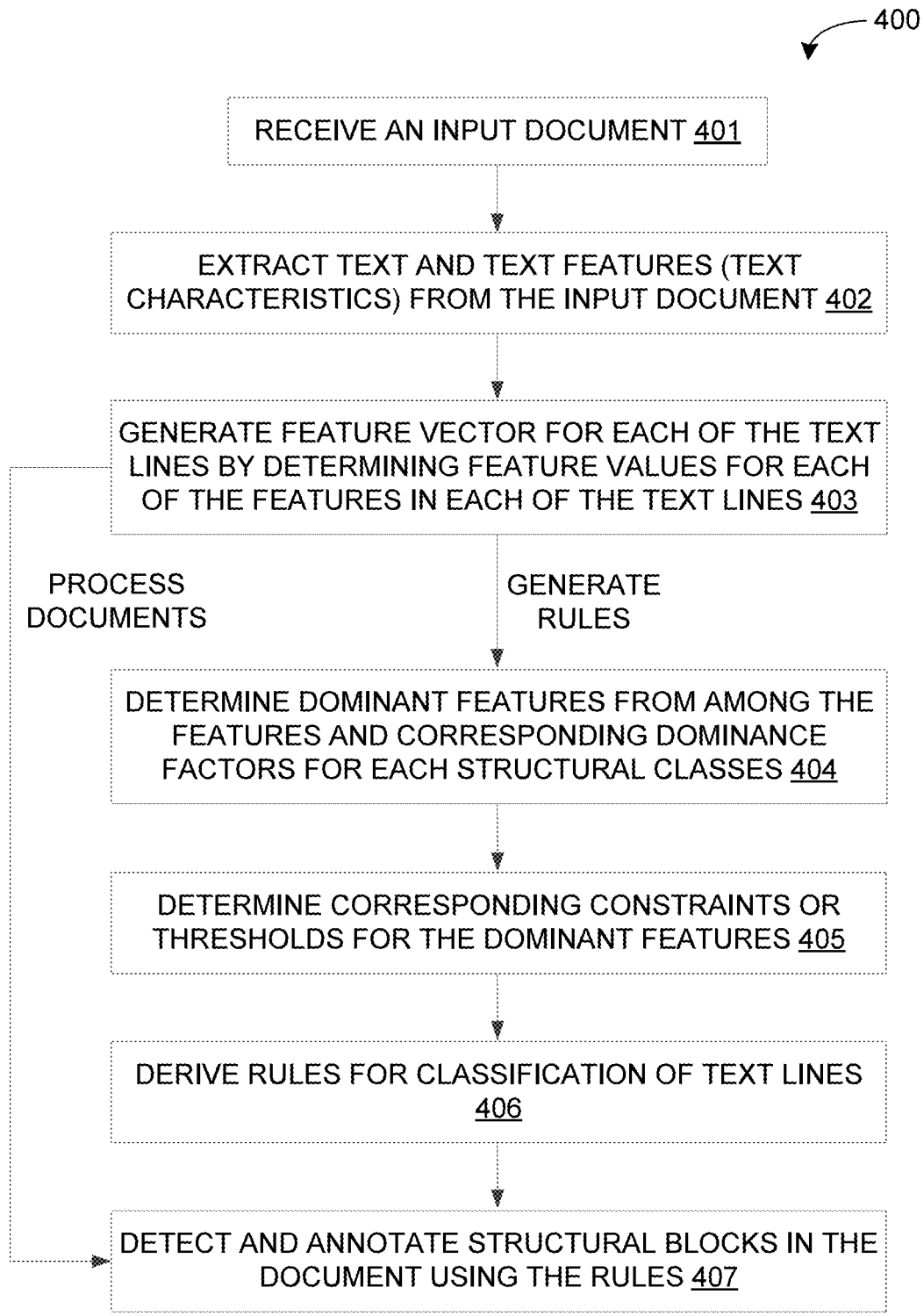
FIG. 4 is a flow diagram of a detailed exemplary process for determining structural blocks of a document, in accordance with some embodiments of the present disclosure.

Referring now to FIG. 4, exemplary control logic 400 for determining structural blocks of a document is depicted in greater detail via a flowchart, in accordance with some embodiments of the present disclosure. As illustrated in the flowchart, at step 401, the control logic 400 may receive an input document to be processed. The input document may be a sample input document for automatic generation of a set of rules for classification of text lines into respective structural classes. Alternatively, the input document may be a test input document for structural blocks identification.

At step 402, the control logic 400 may extract text and text features (text characteristics) from the input document. The text information from the input document may be extracted using a text extractor tool or library. It should be noted that the text extraction tools may not provide complete information of the text present in the input document. As will be appreciated, in some embodiments, the formation of lines in the extracted text may be incorrect. For example, the superscript and subscript in a line may be considered as a different text line. Hence, the control logic 400 may apply predefined or dynamic thresholds so as to extract text line boundaries. Further, it should be noted that if the input document is an image file (that is, image document), it may need to be converted to a text document before extracting text lines and text features.

At step 403, the control logic 400 may generate feature vector for each of the text lines by determining feature values for each of the features in each of the text line. Thus, a feature value may be generated for a corresponding feature in each of the text lines in the document. In some embodiments, the features may include, but may not be limited to, a positional feature (for example, co-ordinates for words, lines, page number, and the like), a font feature (for example, font size, font style, font color, and the like), a count feature (for example, number of words per line, number of characters per line, and the like), and a spacing feature (that is, in comparison with neighboring lines). The feature values may include, but are not limited to, positional coordinates of the text line, a font size in the text line, a font weight in the text line, one or more flags (for example, '0' or '1') for one or more font styles (for example, bold, italics, underline, and the like), a font color in the text line, and a length of the text line. As stated above, the feature values may be based on details of the features (for example, spacing, font details, width, height, and the like) and may be derived using any standard document reader library. Thus, all the features in a text line may have numeric feature values.

As will be appreciated, the font details may help in detecting various structural blocks like section headers, title, and the like, as they may be typically written in bigger font or different font from the paragraph text. Even for footnote, the font properties may be a major differentiator. Also, the width and number of words in the text line may contribute in identifying the non-paragraph text lines as they will have probably lesser words and width than the paragraph text lines. The color feature may also contribute majorly in identifying non-paragraph text lines. For example, generally only the section headers, titles, headers and footers appear in different colors as opposed to the general text. Additionally, the page number feature may contribute in title and table of content text lines classification. Further, spacing between text lines may contribute majorly in the overall classification and detection of paragraph boundaries.

At step 404, the control logic 400 may determine dominant features from among the features and corresponding dominance factor for each structural class. The dominant features and corresponding dominance factor may be determined by analyzing the generated feature vectors (that is, extracted features and their corresponding values) and the tagged text lines (that is, text lines with identified structural tags). As will be appreciated, for deriving a set of rules for detection and extraction of structural blocks and elements of a document, a sample input document may be processed, tagged, and feature vectors generated. All the values for the sample input document may be provided as input dataset to the rule generation module 203 for determining the dominant features and deriving the set of rules. It should be noted that the derivation of the rules so as to classify the text lines may require applying thresholds on each of the features. However, it may be unnecessary to calculate constraints for each feature when it may not be utilized or when it is not contributing in a rule. As will be appreciated, few features may be major contributors to understand the difference between the text lines.

Referring now to FIG. 5A-5D, an exemplary implementation of techniques for deriving a set of rules for classification of text lines into their respective structural classes is illustrated, in accordance with some embodiments of the present disclosure. FIG. 5A illustrates an exemplary image document 501 having paragraphs and a section header separating different sections. As illustrated, there are a number of continuous text lines belonging to the 'paragraph' class. Further, there is a specific text line '2.3.2 Table Extraction Evaluation' that may belong to a 'section header' class.

One of the features generated for each of the text lines is the spacing information in comparison with the neighboring lines. To identify the specific text line as 'section header', the spacing information may not be of much use since all the text lines have similar spacing. In other words, this feature may not carry much weightage in classifying the specific line as section header. However, the style information and the word count information may contribute significantly in differentiating the specific text line into a specific structural class. Hence, for each of the classes in consideration, the dominant features (i.e., the features that contribute significantly in identifying a given class) are determined so as to help in classification.

For each of the text lines in the image document 501, a structural tag may be provided to specify the class it may belong to. The structural tag for the sample input document may be provided manually or may be generated automatically under manual supervision. Further, for each of the text lines in the image document 501, a feature vector may be generated. The input dataset may, therefore, include the feature information and the expected result or tag for each text line of the image document 501. The rule generation module 203 may parse through and analyze the input dataset so as to determine the majorly contributing feature for each class. Further, in the feature vector for each text line, when compared with the feature vectors of the neighboring text lines, the feature value which may have more difference may be ranked higher. In other words, feature value which may have more difference may be given more weightage (i.e., dominance factor) in the rules.

FIG. 5B illustrates an exemplary input dataset 502 including feature vectors (i.e., feature values for various features) and tags for a set of first ten (10) text lines of the image document 501. As illustrated, the feature vector in the input dataset 502 may include ten (10) exemplary features: starting horizontal position coordinate of a text line (X), a median vertical position coordinate of the text line (Y), and ending horizontal position coordinate of a text line (End X), a font size, a number of words in the text line, a flag for 'bold' font style, a flag for 'italic' font style, a previous line spacing, a next line spacing, and a line width. As stated above, the tag may represent the structural class to which the line may belong to. As illustrated, tag 1 in the input dataset 502 may represent the 'paragraph' class, while tag 2 in the input dataset 502 may represent 'section header' class.

As will be appreciated, the rule generation module 203 may parse through and analyze the input dataset 502 so as to determine that the font features contribute more in classification between the two structural classes (i.e., the 'paragraph' class and the 'section header' class) rather than the positional features. Similarly, the rule generation module 203 may parse through and analyze the complete dataset so as to determine the dominant features for each class. Further, the rule generation module 203 may determine that some features may not contribute to identifying a certain class. These features may be discarded for the classification of the particular class. The rule generation module 203 may finally determine a list of dominant features for each class, along with the dominance factor for each feature.

By way of example, as the rule generation module 203 parses input dataset 502 and analyze feature vector of each text line, it compares the feature vector of a given text line with the feature vectors of neighboring text lines so as to determine dominant features for each class. Further, the more the difference in any of the dominant features, the more may be its dominance factor. For example, for a given class, the font size and line width are both determined as dominant features. However, if font size differences are more frequent than the line width differences, or if the font size feature has more difference value than the difference value of line width feature, then the dominance factor for font size will be higher (i.e., font size will have higher rank than line width).

Referring back to FIG. 4, at step 405, the control logic 400 may determine thresholds or constraints for each of the dominant features for each of the structural class. As will be appreciated, each dominant feature considered to classify a text line into a particular structural class may have certain limits for the feature value. For example, if there are two classes that define paragraph text line and paragraph start text line, it may be helpful to know where one paragraph ends and another one begins so as to differentiate between two paragraphs.

Referring now to FIG. 5C, an exemplary image document 503 is illustrated. As illustrated, at the beginning of the paragraph, the text line may have slightly higher spacing than the previous text lines and the indent may be larger (i.e., there may significant difference in the X position). However, the difference in this dominant features should be within a limit so as to have a good accuracy in classification. The rule generation module 203 parses the input dataset 502 so to understand and set thresholds for each of the dominant features considered. For any dominant feature, the initial difference in the dominant feature value may be identified and set as the threshold for that dominant feature. Further, as the rule generation module 203 parses more and more similar samples, the threshold may be dynamically adjusted to a range. For example, if the first para start sample has an X position difference of x3 and in the further samples the same difference value may be slightly higher or lesser (i.e., anywhere between x1 and x5), then the threshold range for this particular feature may be set as x1-x5. Thus, for any text line to be classified into a certain class, it may have to satisfy the threshold conditions of the dominant features considered.

Referring back to FIG. 4, at step 406, the control logic 400 may derive a set of rules for classification of text lines in the document. Each of the set of rules may correspond to a specific structural class and may be derived based on dominant features, corresponding dominance factors, and corresponding threshold values for that class. In some embodiments, each of the rules may be a sum of dominant feature modified by their corresponding dominance factor and their corresponding threshold values. Thus, for each class, the dominant feature having higher dominance factor may be given more weightage. For example, for a class, if there are four dominant features in consideration f1, f2, f3 and f4, where f1 has highest dominance factor d1, f2 and f3 have same dominance factor d2 and d3 but lesser than d1, and f4 has the least dominance factor d4, then the feature value for f1 may be multiplied with a higher dominance value d1 as compared to rest of the features. Similar modifications may be performed with thresholds in consideration. For example, if a feature value x3 for dominant feature f1 in consideration falls within its threshold (i.e., between x1 and x5), a certain value (say, t1) may be added to the feature score (i.e., x3*d1). However, if the value is below or beyond the threshold (i.e., <x1 or >x5), then the percentage of deviation may be deducted from the score (i.e., x3*d1). For example, if the feature value is x7 then the percentage of deviation is calculated (say, −dv1) and the value of the deviation may be deducted from the feature score. Thus, the rules derived for each class may be derived from a logical combination of dominant features, corresponding dominance factors, and corresponding threshold values for that class.

As will be appreciated, for each dominant feature considered, the value may be either absolute feature value (e.g., bold, italic, and the like) or the difference of feature value with neighboring text lines (e.g., spacing, change in font size, and the like). In some embodiments, the values may be normalized to a certain range so as to ensure equal contribution of these values. For example, some feature values are small like 2.5, 3.8, etc., while some other feature values are large like 36.2, 52.3, etc. Thus, the values may be normalized such that each value fall within the same range like 1-10 or 1-100.

Referring now to FIG. 5D, an exemplary rule 504 derived by the rule generation module 203 is illustrated, in accordance with some embodiments of the present disclosure. As stated above, the rule may be used to generate score to predict the probable structural class for each text line in the input document. As illustrated, each of the rules (say, r1 for structural class 1) may be in following format:

$$r1 = f1*d1(\pm t1) + f2*d2(\pm t2) + f3*d3(\pm t3) + \ldots + fn*dn(\pm tn)$$

where, f1, f2, f3 . . . fn are the feature values for the dominant features, d1, d2, d3 . . . dn are the respective dominance factors for the dominant features, and t1, t2, t3 . . . tn are the respective threshold values for the dominant features.

Referring back to FIG. 4, at step 407, the control logic 400 may detect and annotate structural blocks within an input document using the set of derived rules. Once the set of rules for all the structural classes are derived, the classification module 204 may detect and annotate structural blocks within the test input document. In particular, the classification model 204 may determine a structural block tag for each of the text lines by employing the set of rules. For each of the text lines in the input document, the feature extraction module 202 may determine and normalize the feature values. The normalized feature values for a text line may be provided as inputs to the classification module 204, which may determine a set of scores for the text line based on the set of rules. The classification module 204 may further determine the structural block tag corresponding to one of the structural classes for the text line, based on an indicative score among the set of scores.

Referring now to FIG. 6, an exemplary implementation of the set of rules for determining structural class of a text line is illustrated, in accordance with some embodiments of the present disclosure. As illustrate, a set of five (5) rules may be derived for five (5) structural classes. For a given text line in the input document, each of rule may compute a score, which may be indicative of belongingness of the given text line to a particular structural class corresponding to the rule. Thus, for example, for each text line five (5) scores may be calculated and the text line may be classified to the class corresponding to the rule that provided best indicative (e.g., highest or lowest) score. Thus, in the overall result of the classification module 204, each text line of the input document may be classified into its appropriate class, thereby depicting the structure of the input document.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
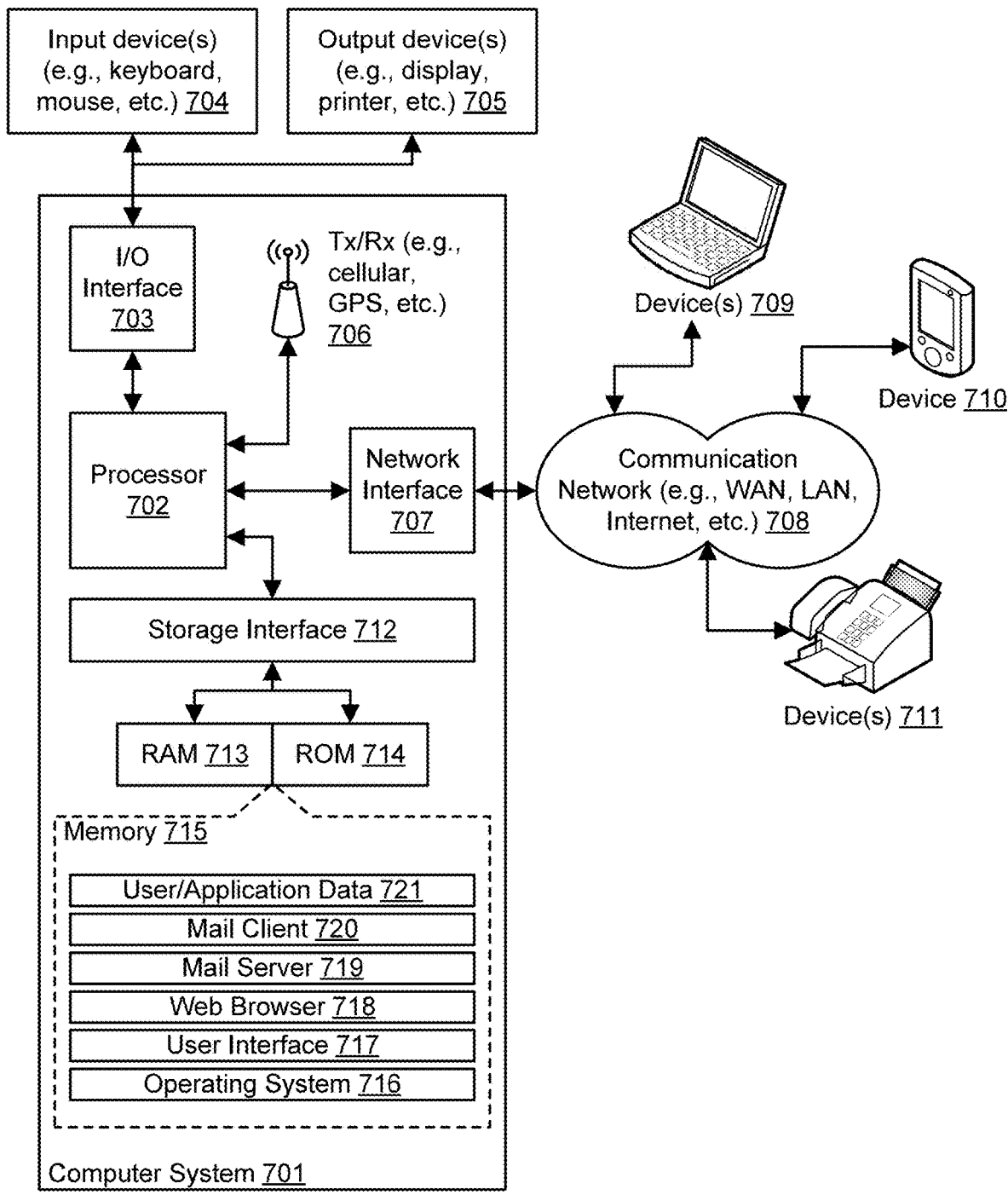
FIG. 7 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 701 for implementing embodiments consistent with the present disclosure is illustrated. Variations of computer system 701 may be used for implementing system 100 for determining structural blocks of a document. Computer system 701 may include a central processing unit ("CPU" or "processor") 702. Processor 702 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800 transceiver, or the like) providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, Infini-Band, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, APPLE® MACINTOSH® OS X, UNIX, Unix-like system distributions (e.g., Berkeley Software Distribution (BSD), FreeBSD, NetBSD, Open-BSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 701 may implement a web browser 718 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 701 may implement a mail server 719 stored program component. The mail server may be an Internet mail server such as MICROSOFT® EXCHANGE®, or the like. The mail server may utilize facilities such as ASP, ActiveX, ANSI C++/C #, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 701 may implement a mail client 720 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 701 may store user/application data 721, such as the data, variables, records, etc. (e.g., documents, extracted text, text lines, features, feature values, feature vector, dominant features, dominance factors, threshold values, set of rules, structural block tags, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for determining and extracting structural blocks of a document using a set of rules. As stated above, existing techniques are domain specific, are based on pre-defined templates, or are capable of segmenting blocks of documents as images, texts, or tables. The techniques described above overcome the challenges faced in existing template based and image based techniques by providing for an automated generation of rules to determine different structural blocks accurately and efficiently. As will be appreciated, the techniques may work across varied document types. In other words, the techniques are generic to all domain and is based on extraction of several different characteristics of the text. Additionally, the techniques do not require pre-defined templates for determining various structural blocks of the documents. Further, the techniques is capable of determining various structural blocks present in a document (for example, paragraphs, footnote, title, section header, and the like) rather than segmenting blocks of the document as images, texts, or tables. The techniques may be deployed easily in any cloud based servers for access and use as an 'application as a service' by any computing device including mobile device.

The techniques described in the various embodiments discussed above are not routine, or conventional, or well understood in the art. The techniques provide for processing and analyzing the input document to detect various structural blocks present in the document (for example, paragraphs, footnote, title, section header, and the like). The information (i.e., feature and feature values) about each text line such as the co-ordinates in the page, the font details, and the like may be extracted and used so as to determine dominant features along with corresponding dominance factors and threshold values for each structural class. It should be noted that the dominance factors and the threshold values may be automatically determined and dynamically adjusted. In other words, the techniques do not require any manual setting of such values. The rules for detection and classification of structural blocks in a document may be automatically generated based on dominant features, corresponding dominance factors, and corresponding threshold values for each of the structural classes.

The specification has described method and system for determining structural blocks of a document. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of determining structural blocks of a document, the method comprising:
   extracting, by a document analysis device, a plurality of text lines from the document;
   generating, by the document analysis device, a feature vector for each of the plurality of text lines by determining a set of feature values for a set of corresponding features in each of the plurality of text lines;
   determining, by the document analysis device, at least one dominant feature from among the set of corresponding features and at least one corresponding dominance factor, for each of a plurality of structural classes, based on the feature vector for each of the plurality of text lines;
   deriving, by the document analysis device, a set of rules for classification of the plurality of text lines into the plurality of structural classes, wherein each of the set of rules correspond to one of the plurality of structural classes and is based on the at least one dominant feature and the at least one corresponding dominance factor for that class; and
   determining, by the document analysis device, a structural block tag for each of the plurality of text lines based on the set of rules.

2. The method of claim 1, further comprising:
   receiving an image document; and
   performing an optical text recognition on the image document to generate the document.

3. The method of claim 1, wherein the extracting the plurality of text lines comprises applying a text extraction tool with a pre-defined or a dynamic threshold on the document.

4. The method of claim 1, wherein the set of corresponding features comprise at least one of a positional feature, a font feature, a count feature, or a spacing feature.

5. The method of claim 1, wherein the set of feature values for the set of corresponding features comprise at least one of positional coordinates of a text line, a font size in the text line, one or more flags for one or more font styles, a length of the text line, or a spacing between at least two of the plurality of text line.

6. The method of claim 1, wherein the determining the at least one dominant feature comprises comparing the feature vector for a text line with a set of feature vectors of a set of neighboring text lines, and wherein the set of neighboring text lines comprises at least one of a pre-defined set of preceding text lines, or a pre-defined set of successive text lines.

7. The method of claim 1, wherein each of the set of rules comprises a sum of the at least one dominant feature modified by the at least one corresponding dominance factor.

8. The method of claim 1, further comprising determining at least one corresponding threshold value for the at least one dominant feature, and wherein each of the set of rules comprises a sum of the at least one dominant feature modified by the at least one corresponding dominance factor and the at least one corresponding threshold value.

9. The method of claim 8, wherein the determining the at least one corresponding threshold value for the at least one dominant feature comprises:
   initializing the at least one corresponding threshold value based on an initial difference between feature values for the at least one dominant feature; and
   dynamically adjusting the at least one corresponding threshold value in each of a plurality of subsequent passes.

10. The method of claim 1, wherein the structural block tag comprises one of a paragraph tag, a paragraph start tag, a paragraph end tag, a single line tag, a title tag, a section header tag, a footnote tag, a list tag, or a table of content tag.

11. The method of claim 1, wherein the determining the structural block tag comprises:
   determining a set of scores for a text line based on the set of rules; and
   determining the structural block tag corresponding to one of the plurality of structural classes based on an indicative score among the set of scores.

12. A system for determining structural blocks of a document, the system comprising:
   a document analysis device comprising at least one processor and a computer-readable medium storing instructions that, when executed by the at least one processor, cause the at least one processor to perform operations comprising:
   extracting a plurality of text lines from the document;
   generating a feature vector for each of the plurality of text lines by determining a set of feature values for a set of corresponding features in each of the plurality of text lines;
   determining at least one dominant feature from among the set of corresponding features and at least one corresponding dominance factor, for each of a plurality of structural classes, based on the feature vector for each of the plurality of text lines;

deriving a set of rules for classification of the plurality of text lines into the plurality of structural classes, wherein each of the set of rules correspond to one of the plurality of structural classes and is based on the at least one dominant feature and the at least one corresponding dominance factor for that class; and determining a structural block tag for each of the plurality of text lines based on the set of rules.

13. The system of claim 12, wherein the extracting the plurality of text lines comprises applying a text extraction tool with a pre-defined or a dynamic threshold on the document.

14. The system of claim 12, wherein the set of corresponding features comprise at least one of a positional feature, a font feature, a count feature, or a spacing feature, and wherein the set of feature values for the set of corresponding features comprise at least one of positional coordinates of a text line, a font size in the text line, one or more flags for one or more font styles, a length of the text line, or a spacing between at least two of the plurality of text line.

15. The system of claim 12, wherein the determining the at least one dominant feature comprises comparing the feature vector for a text line with a set of feature vectors of a set of neighboring text lines, and wherein the set of neighboring text lines comprises at least one of a pre-defined set of preceding text lines, or a pre-defined set of successive text lines.

16. The system of claim 12, wherein each of the set of rules comprises a sum of the at least one dominant feature modified by the at least one corresponding dominance factor.

17. The system of claim 12, wherein the operations further comprise determining at least one corresponding threshold value for the at least one dominant feature, and wherein each of the set of rules comprises a sum of the at least one dominant feature modified by the at least one corresponding dominance factor and the at least one corresponding threshold value.

18. The system of claim 17, wherein the determining the at least one corresponding threshold value for the at least one dominant feature comprises:

initializing the at least one corresponding threshold value based on an initial difference between feature values for the at least one dominant feature; and dynamically adjusting the at least one corresponding threshold value in each of a plurality of subsequent passes.

19. The system of claim 12, wherein the determining the structural block tag comprises:

determining a set of scores for a text line based on the set of rules; and determining the structural block tag corresponding to one of the plurality of structural classes based on an indicative score among the set of scores.

20. A non-transitory computer-readable medium storing computer-executable instructions for:

extracting a plurality of text lines from the document;

generating a feature vector for each of the plurality of text lines by determining a set of feature values for a set of corresponding features in each of the plurality of text lines;

determining at least one dominant feature from among the set of corresponding features and at least one corresponding dominance factor, for each of a plurality of structural classes, based on the feature vector for each of the plurality of text lines;

deriving a set of rules for classification of the plurality of text lines into the plurality of structural classes, wherein each of the set of rules correspond to one of the plurality of structural classes and is based on the at least one dominant feature and the at least one corresponding dominance factor for that class; and determining a structural block tag for each of the plurality of text lines based on the set of rules.

\* \* \* \* \*